United States Patent
Omura et al.

(10) Patent No.: US 11,233,267 B2
(45) Date of Patent: Jan. 25, 2022

(54) SEPARATOR, BATTERY MODULE AND BATTERY MODULE PRODUCTION METHOD

(71) Applicant: Panasonic Intellectual Property Management Co., Ltd., Osaka (JP)

(72) Inventors: Tetsuji Omura, Osaka (JP); Momoko Hiranuma, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/489,413

(22) PCT Filed: Feb. 21, 2018

(86) PCT No.: PCT/JP2018/006137
§ 371 (c)(1),
(2) Date: Aug. 28, 2019

(87) PCT Pub. No.: WO2018/163816
PCT Pub. Date: Sep. 13, 2018

(65) Prior Publication Data
US 2020/0075988 A1    Mar. 5, 2020

(30) Foreign Application Priority Data
Mar. 7, 2017 (JP) .............................. JP2017-042458

(51) Int. Cl.
*H01M 10/04* (2006.01)
*H01M 10/617* (2014.01)
(Continued)

(52) U.S. Cl.
CPC ..... *H01M 10/0481* (2013.01); *H01M 10/617* (2015.04); *H01M 10/625* (2015.04);
(Continued)

(58) Field of Classification Search
CPC .. H01M 2/0245; H01M 2/1016; H01M 50/20; H01M 10/60; H01M 10/617;
(Continued)

(56) References Cited

U.S. PATENT DOCUMENTS

| 2008/0124622 A1* | 5/2008 | Hamada ............... H01M 50/20 429/149 |
| 2010/0151309 A1* | 6/2010 | Marukawa ........ H01M 10/6557 429/120 |

(Continued)

FOREIGN PATENT DOCUMENTS

| JP | 2014010983 A * | 1/2014 |
| WO | 2012/117681 | 9/2012 |

OTHER PUBLICATIONS

Machine Translation of JP 2014010983A Description and Drawings Originally Published to Takashi on Jan. 2014 (Year: 2014).*

(Continued)

*Primary Examiner* — Maria Laios
*Assistant Examiner* — Grace Ann Kenlaw
(74) *Attorney, Agent, or Firm* — McDermott Will and Emery LLP

(57) ABSTRACT

A separator includes an intervening portion that is disposed between two adjacent batteries and insulates the two batteries, an input part that receives external force input during assembly of a battery module and is deformable by the external force, and a battery pressing part that is in contact with a first surface of one of batteries, the first surface extending in a stack direction X of the batteries, and use the external force input into the input part to press the first surface.

20 Claims, 11 Drawing Sheets

(51) Int. Cl.
  *H01M 10/625* (2014.01)
  *H01M 10/6551* (2014.01)
  *H01M 10/6555* (2014.01)
  *H01M 50/20* (2021.01)

(52) U.S. Cl.
  CPC ... *H01M 10/6551* (2015.04); *H01M 10/6555* (2015.04); *H01M 50/20* (2021.01); *H01M 2220/20* (2013.01)

(58) Field of Classification Search
  CPC .......... H01M 10/647; H01M 50/289; H01M 50/291; H01M 50/293; H01M 10/0481; H01M 10/625; H01M 10/6551; H01M 10/6555; H01M 10/6554; H01M 10/613
  See application file for complete search history.

(56) References Cited

U.S. PATENT DOCUMENTS

| | | | |
|---|---|---|---|
| 2013/0337310 A1 | 12/2013 | Omura et al. | |
| 2015/0333304 A1* | 11/2015 | Sekine | H01M 50/20 429/153 |
| 2016/0072159 A1* | 3/2016 | Tsuruta | H01M 10/48 429/90 |
| 2016/0329617 A1 | 11/2016 | Omura et al. | |

OTHER PUBLICATIONS

International Search Report of PCT application No. PCT/JP2018/006137 dated Apr. 3, 2018.

\* cited by examiner

SEPARATOR, BATTERY MODULE AND BATTERY MODULE PRODUCTION METHOD

This application is a U.S. national stage application of the PCT International Application No. PCT/JP2018/006137 filed on Feb. 21, 2018, which claims the benefit of foreign priority of Japanese patent application No. 2017-042458 filed on Mar. 7, 2017, the contents all of which are incorporated herein by reference.

TECHNICAL FIELD

The present invention relates to a separator, a battery module, and a battery module production method.

BACKGROUND ART

Some power sources, such as power sources for vehicles, need to output high voltage. As such a power source, a battery module that includes a battery stack that includes a plurality of batteries connected in series is known. PTL 1 discloses such a battery module. The battery module disclosed in PTL 1 includes a battery stack, a heat dissipating member that is sheet-shaped and is thermally connected to each of batteries of the battery stack, and an intervening layer that adheres to the battery stack and the heat dissipating member and transfers heat of the battery stack to the heat dissipating member.

CITATION LIST

Patent Literature

PTL 1: WO 2012/117681 A

SUMMARY OF THE INVENTION

In the battery module described above, the intervening layer between the battery stack and the heat dissipating member absorbs dimensional variation in batteries caused by manufacturing errors, for example. Further, it is intended that the intervening layer uniformly cools the battery stack. However, the structure still leaves variation in distances between the batteries and the heat dissipating member. Therefore, variation in degrees to which the batteries are cooled is larger than variation in degrees to which batteries that are directly in contact with a heat dissipating member are cooled.

The present invention is made considering the above situation. It is an object of the present invention to provide a technique that cools uniformly a battery stack.

An aspect of the present invention is a separator. The separator is used in a battery module that includes a plurality of batteries stacked. The separator includes: an intervening portion that is between two adjacent batteries of the plurality of batteries and insulates the two adjacent batteries; an input part that receives external force input during assembly of the battery module and that is deformable by the external force; and a battery pressing part that is in contact with a first surface of one of the two adjacent batteries, the first surface extending in a stack direction of the plurality of batteries, and uses the external force input into the input part to press the first surface.

Another aspect of the present invention is a battery module. The battery module includes: a plurality of batteries stacked; a plurality of the separators according to the aspect described above that are each between two adjacent batteries of the plurality of batteries and each insulate the two adjacent batteries; and a heat dissipater that is in contact with a second surface of each of the plurality of batteries that is opposite the first surface of the battery that is pressed by the battery pressing part of corresponding one of the separators and dissipates heat of the plurality of batteries.

Another aspect of the present invention is a battery module production method. The production method includes: alternately stacking a plurality of batteries and a plurality of the separators according to the aspect described above, disposing the intervening portion of each of the separators between two adjacent batteries of the plurality of batteries, and allowing the battery pressing part of each of the separators to be in contact with the first surface of one of the two adjacent batteries, the first surface extending in the stack direction; and pressing a first jig against the input part of each of the separators, pressing a second jig against a second surface of each of the plurality of batteries that is opposite the first surface of the battery, and thus positioning the plurality of batteries.

The present invention allows a battery stack to be uniformly cooled.

DESCRIPTION OF EMBODIMENTS

Figure 1:
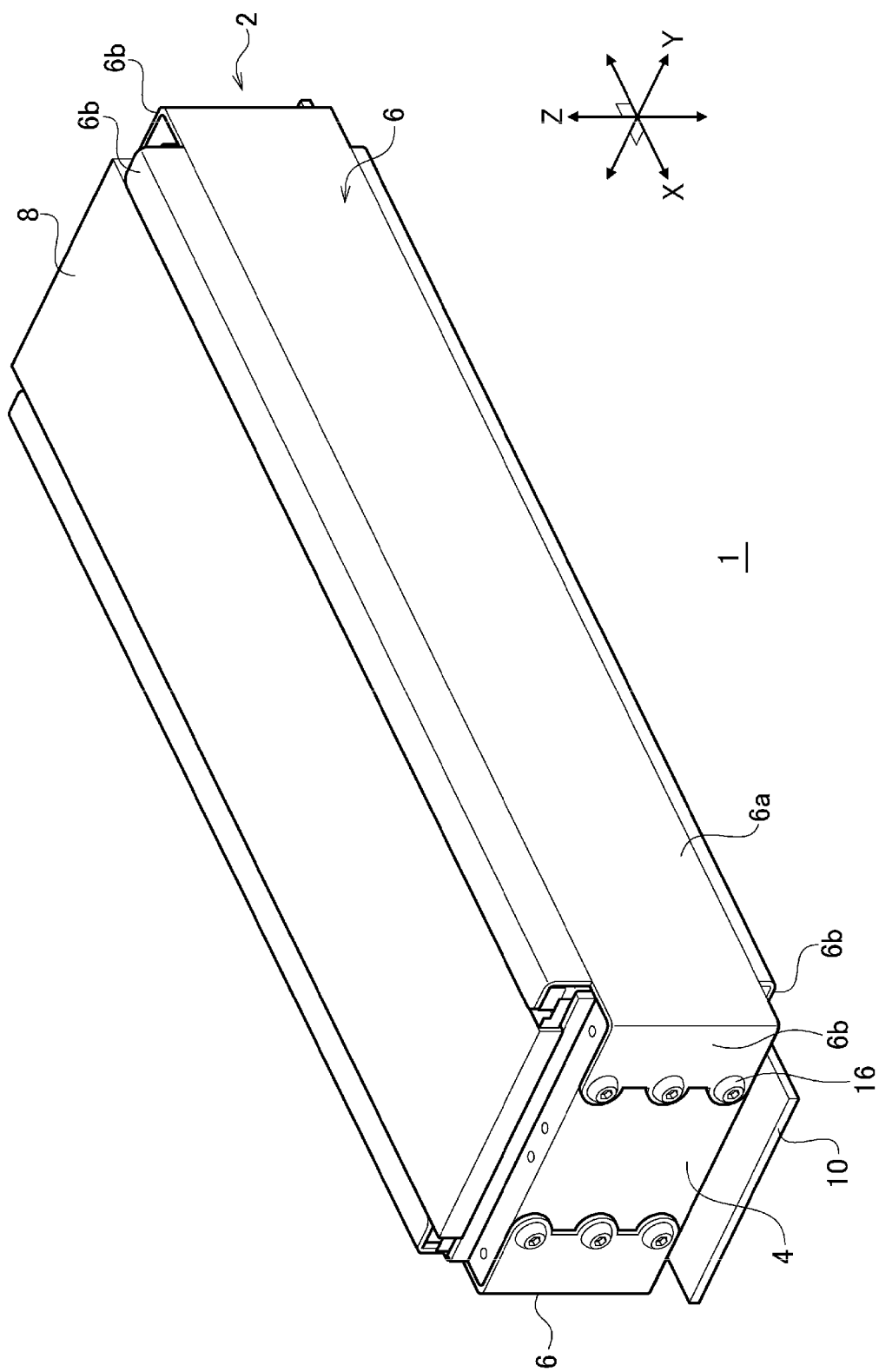
FIG. 1 is a schematic perspective view that illustrates a structure of a battery module according to an exemplary embodiment.

Hereinafter, the present invention will be described based on a preferred exemplary embodiment with reference to the drawings. The exemplary embodiment is an exemplification and does not limit the invention. All features described in the exemplary embodiment and combinations of all the features are not necessarily essential to the invention. The same reference marks are assigned to the same or equivalent components, members, and processes illustrated in the drawings. Explanation for the same or equivalent components, members, and processes will not be repeated as appropriate. For convenience, scales or shapes of portions illustrated in the drawings are determined to facilitate explanation of the portions. The scales or shapes of portions should not be interpreted as limitation unless otherwise mentioned. Even the same members in different drawings may slightly differ from each other in scale or the like. Further, terms "first", "second", and the like used in the present description and claims do not mean any order or importance, but are intended to distinguish between one configuration and another configuration.

Figure 2:
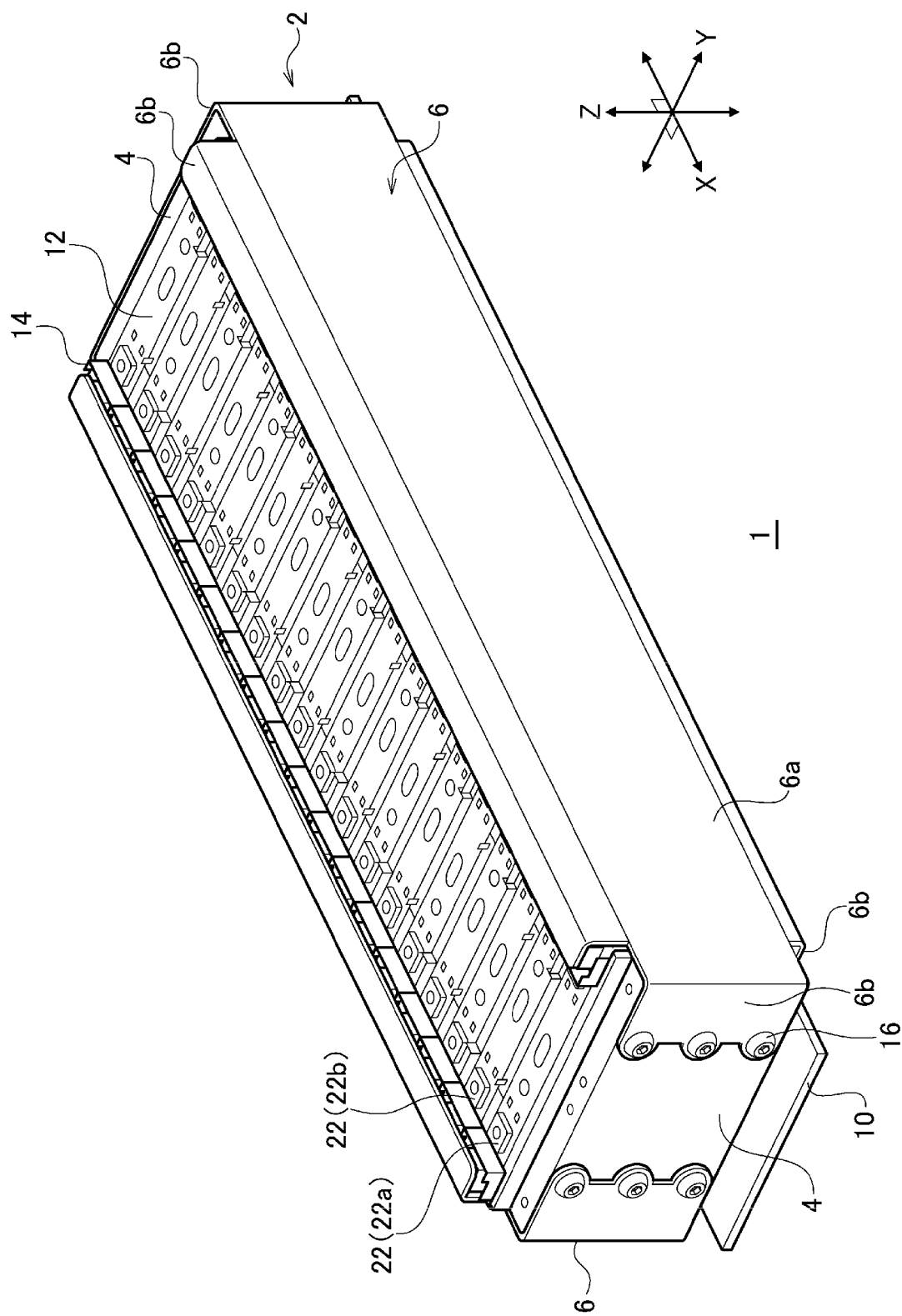
FIG. 2 is a perspective view of the battery module from which a cover is removed.

FIG. 1 is a schematic perspective view that illustrates a structure of a battery module according to an exemplary embodiment. FIG. 2 is a perspective view of the battery module from which a cover is removed. Battery module 1 mainly includes battery stack 2, cover 8, and heat dissipater 10.

Battery stack 2 includes a plurality of batteries 12, a plurality of separators 14, a pair of end plates 4, and a pair of restraint members 6. For example, 18 batteries 12 are connected in series with bus bars (not illustrated) to form battery stack 2 in the present exemplary embodiment.

For example, each battery 12 is a rechargeable secondary battery, such as a lithium-ion battery, a nickel-hydrogen battery, or a nickel-cadmium battery. Battery 12 is what is called prismatic battery. The plurality of batteries 12 are stacked at predetermined intervals. Main surfaces of adjacent batteries 12 face each other. Hereinafter, a direction in which batteries 12 are stacked is stack direction X (a direction represented by arrow X in FIGS. 1 and 2). The "stack" means an arrangement of a plurality of members in any one direction. Therefore, stacking batteries 12 includes arranging the plurality of batteries 12 in a horizontal direction.

In two adjacent batteries 12 that have been arrayed, positive-electrode output terminal 22 (positive-electrode terminal 22a) of one of batteries 12 is adjacent to negative-electrode output terminal 22 (negative-electrode terminal 22b) of the other battery 12. Hereinafter, if polarities of output terminals 22 do not need to be distinguished, positive-electrode terminals 22a and negative-electrode terminals 22b are collectively referred to as output terminals 22. Positive-electrode terminal 22a and negative-electrode terminal 22b that are adjacent to each other are electrically connected in series with a bus bar. The bus bar is a strip-shaped metal sheet, for example. One end of the bus bar is electrically connected to positive-electrode terminal 22a of one of batteries 12. The other end of the bus bar is electrically connected to negative-electrode terminal 22b of the other battery 12. In two adjacent batteries 12 that have been arrayed, positive-electrode terminal 22a of one of batteries 12 may be adjacent to positive-electrode terminal 22a of the other battery 12. For example, if two adjacent batteries 12 are connected in parallel, output terminals 22 of a same polarity are adjacent to each other in arrayed batteries 12.

Separators 14 are also called insulating spacers. Separators 14 are made of a resin that has an insulation property, for example. Each separator 14 is between two adjacent batteries 12, and electrically insulates two adjacent batteries 12. Separator 14 is also between battery 12 and end plate 4, and insulates battery 12 and end plate 4. For example, separators 14 are made of a thermoplastic resin, such as polypropylene (PP) or polybutylene terephthalate (PBT).

The pair of end plates 4 sandwich the plurality of batteries 12 and the plurality of separators 14 that are alternately stacked. The pair of end plates 4 are adjacent to respective batteries 12 that are outermost in stack direction X. Separator 14 is between end plate 4 and battery 12 that are adjacent to each other. For example, end plates 4 are made of metal, such as aluminum. Since separator 14 is between end plate 4 and battery 12 that are adjacent to each other, separator 14 insulates end plate 4 and battery 12. A main surface of each end plate 4 includes screw holes 4a (see FIG. 6). Fastening screws 16 are screwed into screw holes 4a.

The pair of restraint members 6 are arrayed in direction Y perpendicular to stack direction X (direction Y is a direction represented by arrow Y in FIGS. 1 and 2). An assembled set that includes the plurality of batteries 12, the plurality of separators 14, and the pair of end plates 4 is disposed between the pair of restraint members 6. Each restraint member 6 includes plane 6a that is rectangular and is parallel to a side surface of the assembled set, and eaves portions 6b that protrude from ends of sides of plane 6a toward the assembled set. Restraint member 6 is formed by folding each side of a rectangular metal sheet, for example. Two eaves portions 6b that are opposite each other in stack direction X are in contact with the main surfaces of respective end plates 4. Consequently, the pair of restraint members 6 sandwich the plurality of batteries 12, the plurality of separators 14, and the pair of end plates 4 in stack direction X. Two eaves portions 6b that are opposite each other in stack direction X each include through holes 6c (see FIG. 9). Fastening screws 16 are inserted through through holes 6c.

Cover 8 is also called a top cover, and covers a surface of battery stack 2. The covered surface is a surface from which output terminals 22 project. A direction in which battery stack 2 and cover 8 are stacked is direction Z (a direction represented by arrow Z in FIGS. 1 and 2). Cover 8 is a sheet-shaped member, and has a shape that corresponds to a shape of a top surface of battery stack 2. Cover 8 is rectangular in the present exemplary embodiment. Cover 8 prevents output terminals 22 of batteries 12, valves 24 that will be described later, the bus bars, and the like from being brought into contact with condensed water, dust, and the like. Cover 8 is made of a resin that has an insulation property, for example. For example, cover 8 is made of a thermoplastic resin, such as polypropylene (PP) or polybutylene terephthalate (PBT). Cover 8 is fixed to a top surface of battery stack 2 with a publicly known fixing structure that includes a screw or a publicly known fixing mechanism (not illustrated). Cover 8 may be fixed to battery stack 2 by fitting both ends of cover 8 onto upper portions of separators 14.

Heat dissipater 10 is a member that dissipates heat of the plurality of batteries 12. Heat dissipater 10 has insulation property and heat transfer property. For example, heat dissipater 10 is a heat transfer sheet made of a resin material, such as a silicone resin or an acrylic resin. Alternatively, heat dissipater 10 may be a stack that includes a sheet of metal, such as iron or aluminum, and an insulating sheet. After battery stack 2 is installed on heat dissipater 10, each battery 12 is in contact with heat dissipater 10 (see FIG. 5). Heat dissipater 10 absorbs heat generated within each battery 12, and thus cools each battery 12.

Figure 3:
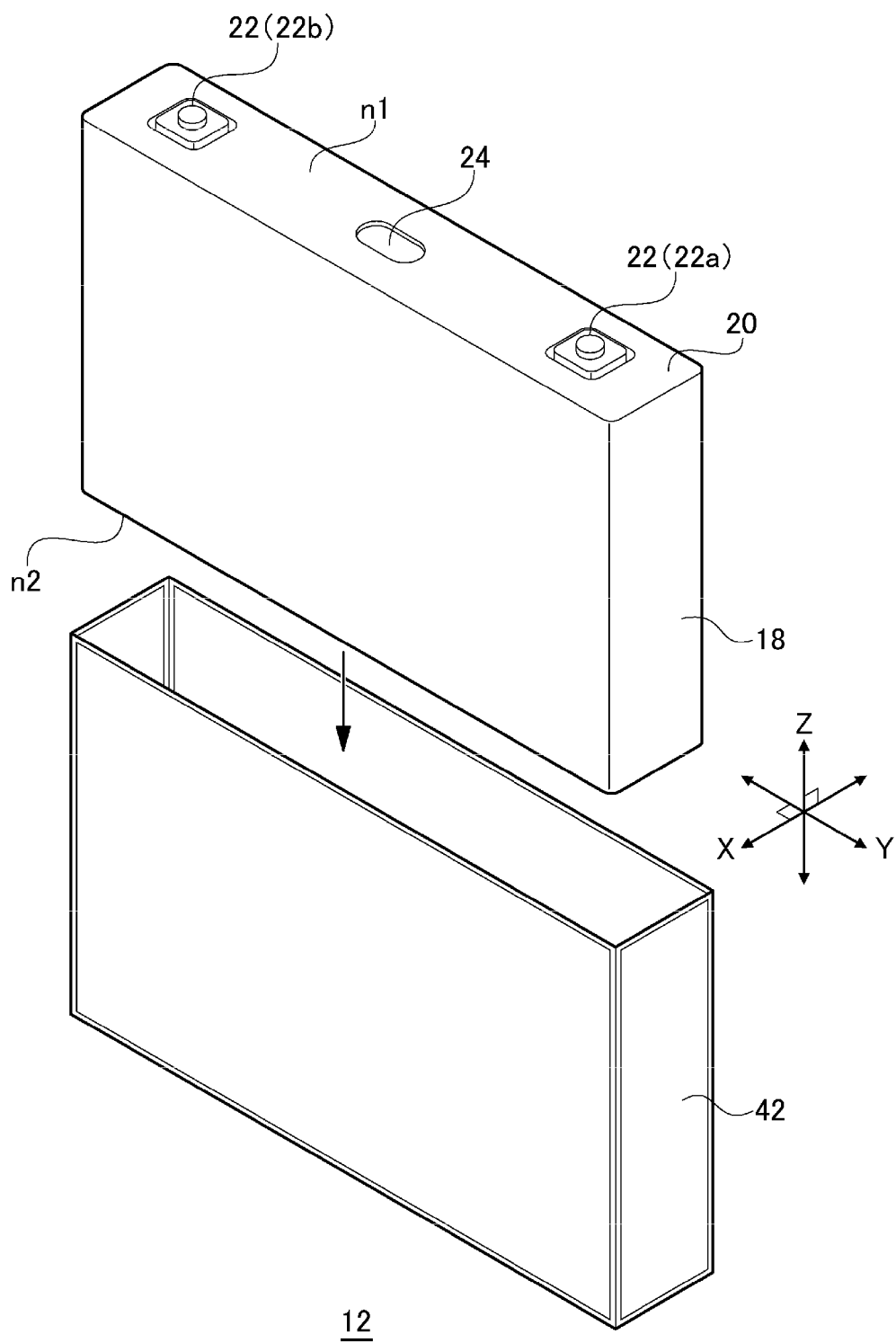
FIG. 3 is a schematic exploded perspective view that illustrates a structure of a battery.

Next, structures of each battery 12 and each separator 14 will be described in detail. FIG. 3 is a schematic exploded perspective view that illustrates a structure of battery 12. Battery 12 includes exterior can 18 that has a flat rectangular-parallelepiped shape. An opening that is substantially rectangular is formed in a surface of exterior can 18. An electrode assembly, electrolyte, and the like are put into exterior can 18 through the opening. Sealing plate 20 is attached to and seals the opening of exterior can 18. Sealing plate 20 includes positive-electrode terminal 22a near one of ends, in a longitudinal direction, of sealing plate 20, and includes negative-electrode terminal 22b near the other end, in the longitudinal direction, of sealing plate 20. Sealing plate 20 and output terminals 22 constitute a sealing body. Exterior can 18 and sealing plate 20 are made of metal. Typically, exterior can 18 and sealing plate 20 are made of aluminum or aluminum alloy, for example. Output terminals 22 are made of metal that has electrical conductivity.

In the present exemplary embodiment, a side on which the sealing body is attached is top surface n1 of battery 12, and a side opposite the side on which the sealing body is attached is bottom surface n2 of battery 12. Battery 12 also includes two main surfaces that connect top surface n1 with bottom surface n2. Areas of the main surfaces are the largest of areas of six surfaces of battery 12. Two surfaces of battery 12 that are not top surface n1, bottom surface n2, and the two main surfaces are side surfaces of battery 12. A top-surface side of batteries 12 is a top surface of battery stack 2. A bottom-surface side of batteries 12 is a bottom surface of battery stack 2.

Battery 12 includes valve 24 in a surface. Valve 24 releases gas generated within battery 12. In the present exemplary embodiment, battery 12 includes valve 24 in top surface n1. Valve 24 is between a pair of output terminals 22 of sealing plate 20. Specifically, valve 24 is at substantially a center of sealing plate 20 in the longitudinal direction. Valve 24 is configured to open and release gas within exterior can 18 if pressure within exterior can 18 rises to a predetermined value or more. Valve 24 is also called a safety valve or a vent.

Battery 12 also includes insulating film 42. For example, insulating film 42 is a heat-shrink tube. After insulating film 42 accommodates exterior can 18, insulating film 42 is heated. Consequently, insulating film 42 shrinks, and thus coats a surface of exterior can 18. Insulating film 42 prevents short circuit between adjacent batteries 12.

Figure 4:
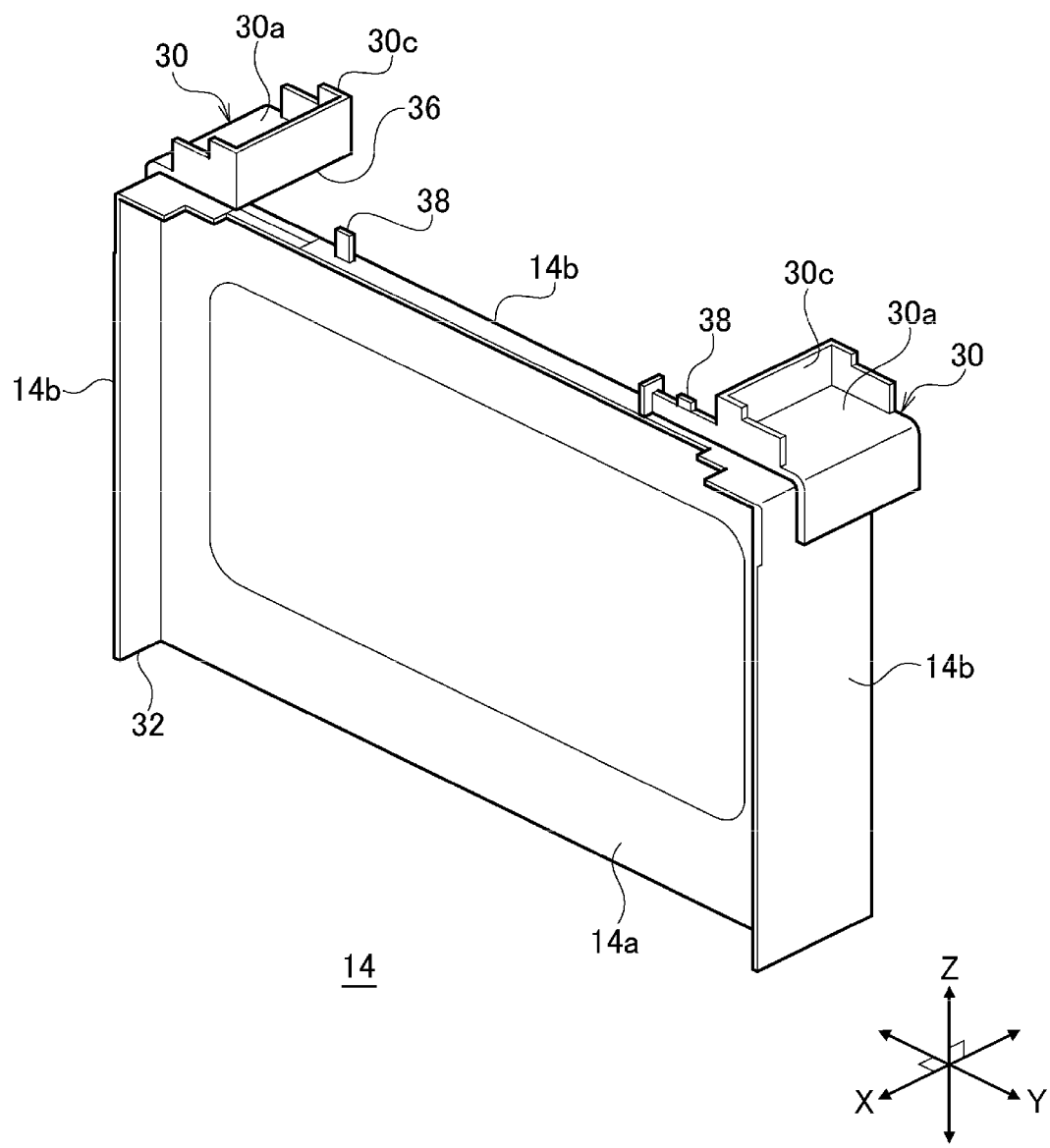
FIG. 4 is a schematic perspective view that illustrates a structure of a separator.
Figure 5:
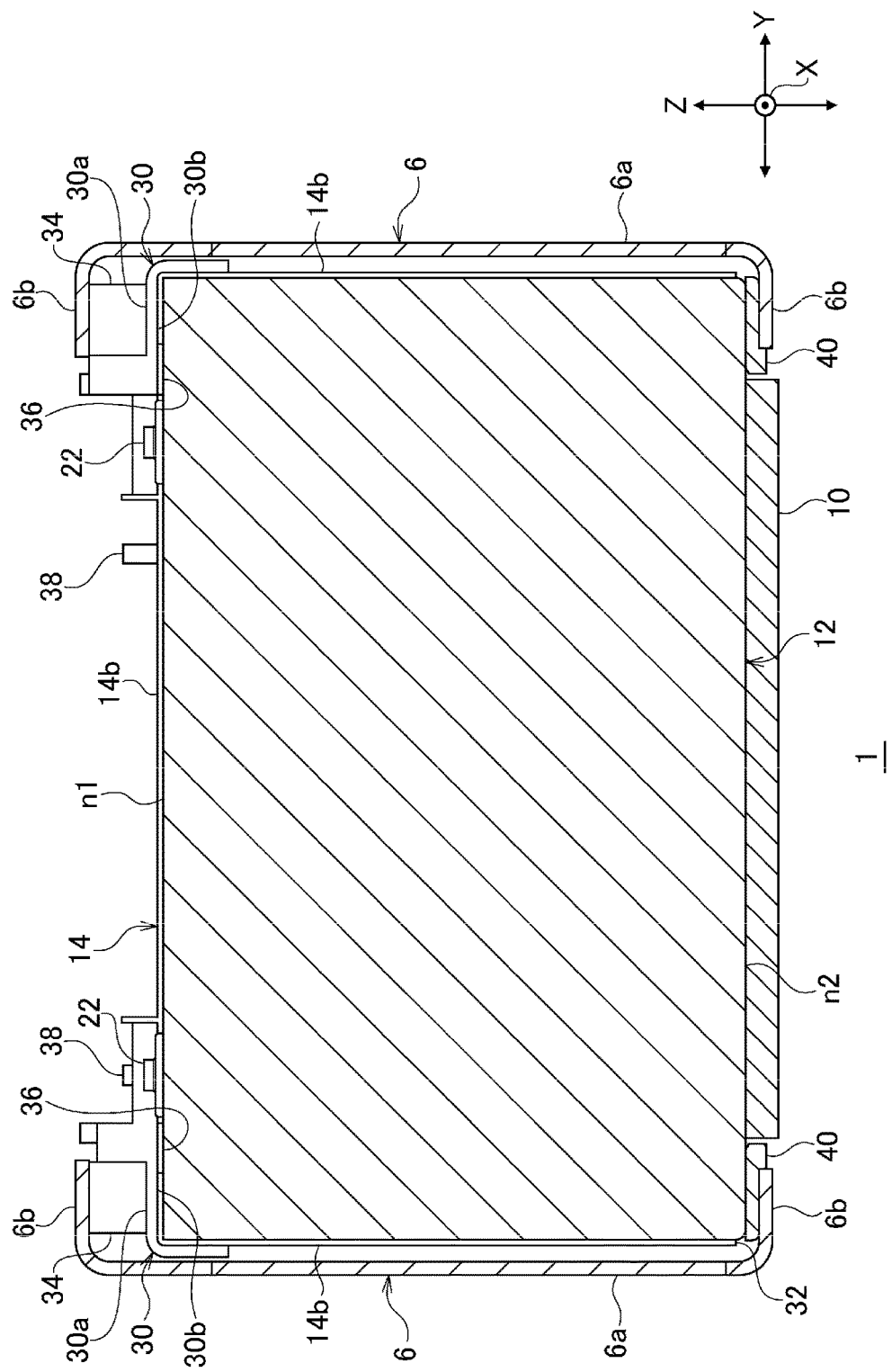
FIG. 5 illustrates a battery, a separator, restraint members, and a heat dissipater that are assembled and viewed in a stack direction.

FIG. 4 is a schematic perspective view that illustrates a structure of separator 14. FIG. 5 illustrates battery 12, separator 14, restraint members 6, and heat dissipater 10 that are assembled and viewed in stack direction X. FIG. 5 does not illustrate cover 8. Each separator 14 includes intervening portion 14a that is flat-sheet-shaped and extends parallel to the main surfaces of battery 12, and wall 14b that extends from an edge of intervening portion 14a in stack direction X. Intervening portion 14a extends along main surfaces of two adjacent batteries 12 that are opposite each other.

Intervening portion 14a is between two adjacent batteries 12, and thus insulates two batteries 12. Intervening portion 14a also extends between battery 12 and end plate 4. Consequently, intervening portion 14a insulates battery 12 and end plate 4. After separator 14 and batteries 12 are assembled, an end, on a bottom-surface side of batteries 12, of intervening portion 14a is disposed to an upper-surfaces-n1 side of batteries 12, being apart from bottom surfaces n2 of batteries 12. That is, a lower end of separator 14 is above bottom surfaces n2 of batteries 12.

Wall 14b covers part of top surfaces n1, and side surfaces of batteries 12. Consequently, wall 14b prevents short circuit between adjacent batteries 12, short circuit between battery 12 and end plate 4, or short circuit between battery 12 and restraint member 6 caused by condensation on a surface of battery 12 or end plate 4. In other words, wall 14b secures a creepage distance between adjacent batteries 12 or between battery 12 and end plate 4. Wall 14b includes cutout 32. Cutout 32 exposes bottom surfaces n2 of batteries 12. In other words, separator 14 does not include wall 14b at a position that corresponds to bottom surfaces n2 of batteries 12. Consequently, after battery stack 2 is installed on heat dissipater 10, bottom surfaces n2 of batteries 12 are in contact with heat dissipater 10.

A pair of supports 30 are attached to both upper corners of separator 14, respectively. Each upper corner of separator 14 is a region where wall 14b that covers top surface n1 of battery 12 joins wall 14b that covers a side surface of battery 12. Each support 30 protrudes in stack direction X more than wall 14b that exists between output terminals 22 in direction Y protrudes in stack direction X. Each support 30 includes top surface 30a that faces in a same direction as a direction in which top surface n1 of battery 12 faces. That is, top surface 30a faces toward cover 8. Each support 30 also includes bottom surface 30b that faces top surface n1 of battery 12. Each support 30 also includes frame 30c that protrudes in direction Z from an edge of top surface 30a.

First positioning member 34 is disposed on top surface 30a of support 30. First positioning member 34 positions battery 12. First positioning member 34 is made of elastic rubber, for example. First positioning member 34 is sandwiched by support 30 and eaves portion 6b of restraint member 6. Battery pressing part 36 protrudes from bottom surface 30b of support 30 toward battery 12. Battery pressing part 36 is in contact with top surface n1 of battery 12. Top surface n1 of battery 12 is a first surface that extends in stack direction X. Bottom surface n2 of battery 12 that is in contact with heat dissipater 10 is a second surface that is opposite to the first surface.

Battery pressing part 36 is in contact with top surface n1 of only one of two batteries 12 that sandwich separator 14. That is, separator 14 is configured not to regulate displacement of the other battery 12 relative to separator 14. Further, there are no structures that fit together between adjacent separators 14. That is, separator 14 is configured not to regulate displacement of adjacent separators 14 relative to separator 14. Therefore, displacement of a set of battery 12 and separator 14 is not regulated by an adjacent set of battery 12 and separator 14.

Input parts 38 protrude from wall 14b that covers top surfaces n1 of batteries 12. Input parts 38 protrude toward cover 8. Each input part 38 is flat-sheet-shaped and has a narrow width. At least front ends of input parts 38 are more apart from batteries 12 in direction Z than battery pressing parts 36 are apart from batteries 12 in direction Z. Two input parts 38 are arranged in direction Y in the present exemplary embodiment. External force F1 (see FIG. 8A) is input into input parts 38 during assembly of battery module 1. Input parts 38 are deformable by external force F1. In the present exemplary embodiment, input parts 38 have rigidity lower than rigidity of intervening portion 14a. Consequently, external force F1 surely deforms input parts 38. Since input parts 38 have a thickness smaller than a thickness of intervening portion 14a, input parts 38 have lower rigidity (see FIG. 8B). Each separator 14 according to the present exemplary embodiment does not include a portion that protrudes more than two input parts 38 in direction Z and is between two input parts 28 in direction Y.

Figure 8A:
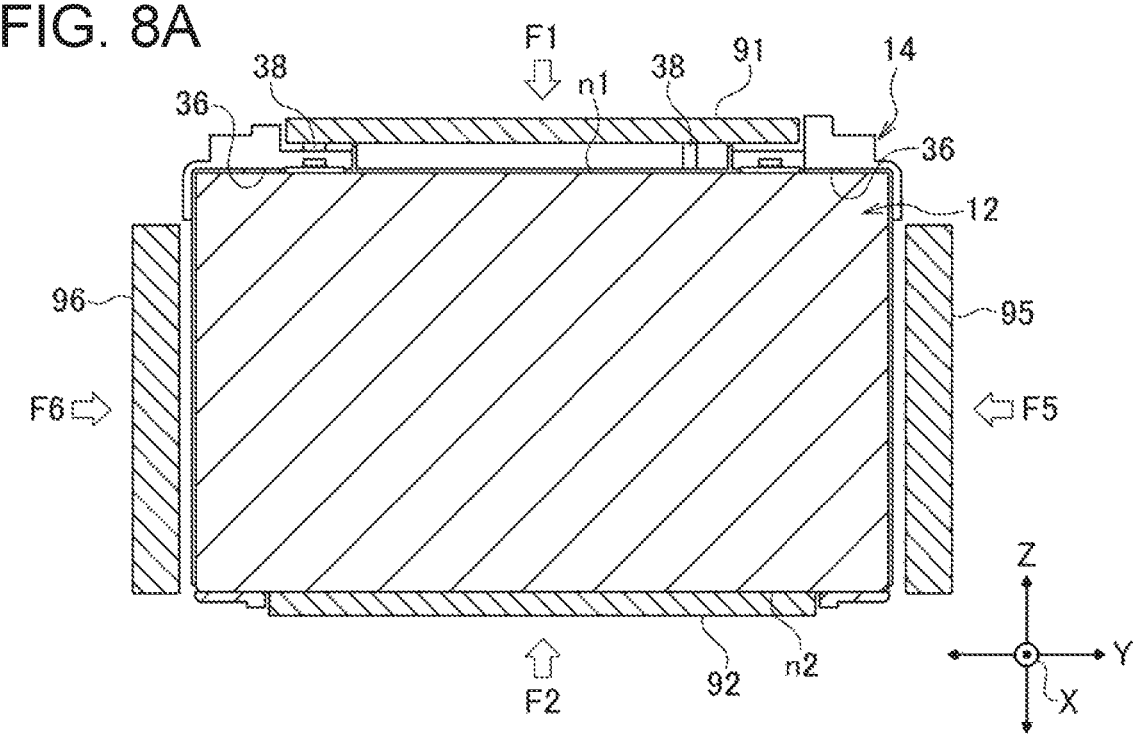
FIGS. 8A and 8B are process diagrams that illustrate the battery module production method.
Figure 8B:
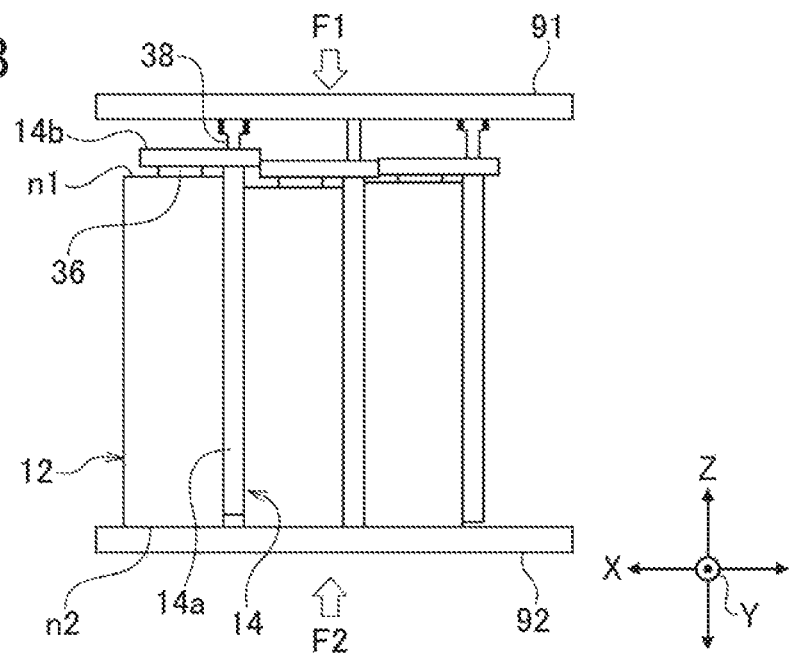

Further, input parts 38 and battery pressing parts 36 are at different positions in stack direction X (see also FIG. 8B). That is, input parts 38 are away from spaces over batteries 12. In the present exemplary embodiment, input parts 38 seen in direction Z overlap intervening portion 14a. In other words, input parts 38 and intervening portion 14a are in a same plane.

Second positioning members 40 are disposed on both ends, in direction Y, of a bottom surface of battery 12. Second positioning members 40 are made of a resin, such as polybutylene terephthalate (PBT) or polypropylene (PP).

Second positioning members 40 are sandwiched by a bottom surface of battery stack 2 and eaves portions 6b of restraint members 6. Second positioning members 40 are interposed between bottom surfaces of batteries 12 and eaves portions 6b of restraint members 6, and thus insulate bottom surfaces of batteries 12 and restraint members 6. First positioning members 34 and second positioning members 40 position batteries 12 of battery stack 2 relative to restraint members 6 in direction Z.

(Battery Module Production Method)

Figure 6:
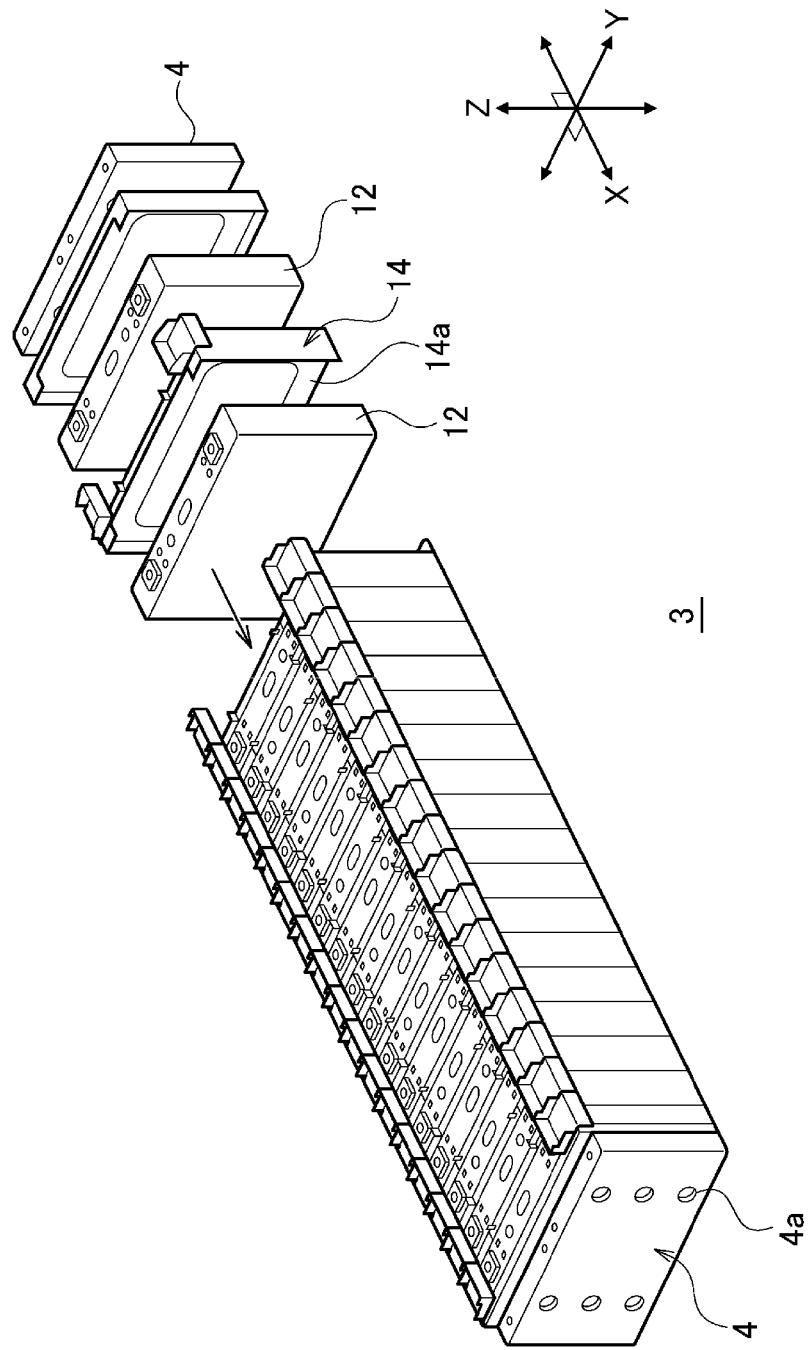
FIG. 6 is a process diagram that illustrates a battery module production method.

FIGS. 6, 7, 8A, 8B, and 9 are process diagrams that illustrate a method of producing battery module 1. First, a plurality of batteries 12 and a plurality of separators 14 are alternately stacked, as illustrated in FIG. 6. Batteries 12 and separators 14 that have been stacked are sandwiched with a pair of end plates 4 to form assembled set 3. In assembled set 3 that has been formed, intervening portion 14a of each separator 14 is between two adjacent batteries 12. Further, battery pressing parts 36 (see FIGS. 8A, 8B) are brought into contact with top surface n1 of one of batteries 12.

Figure 7:
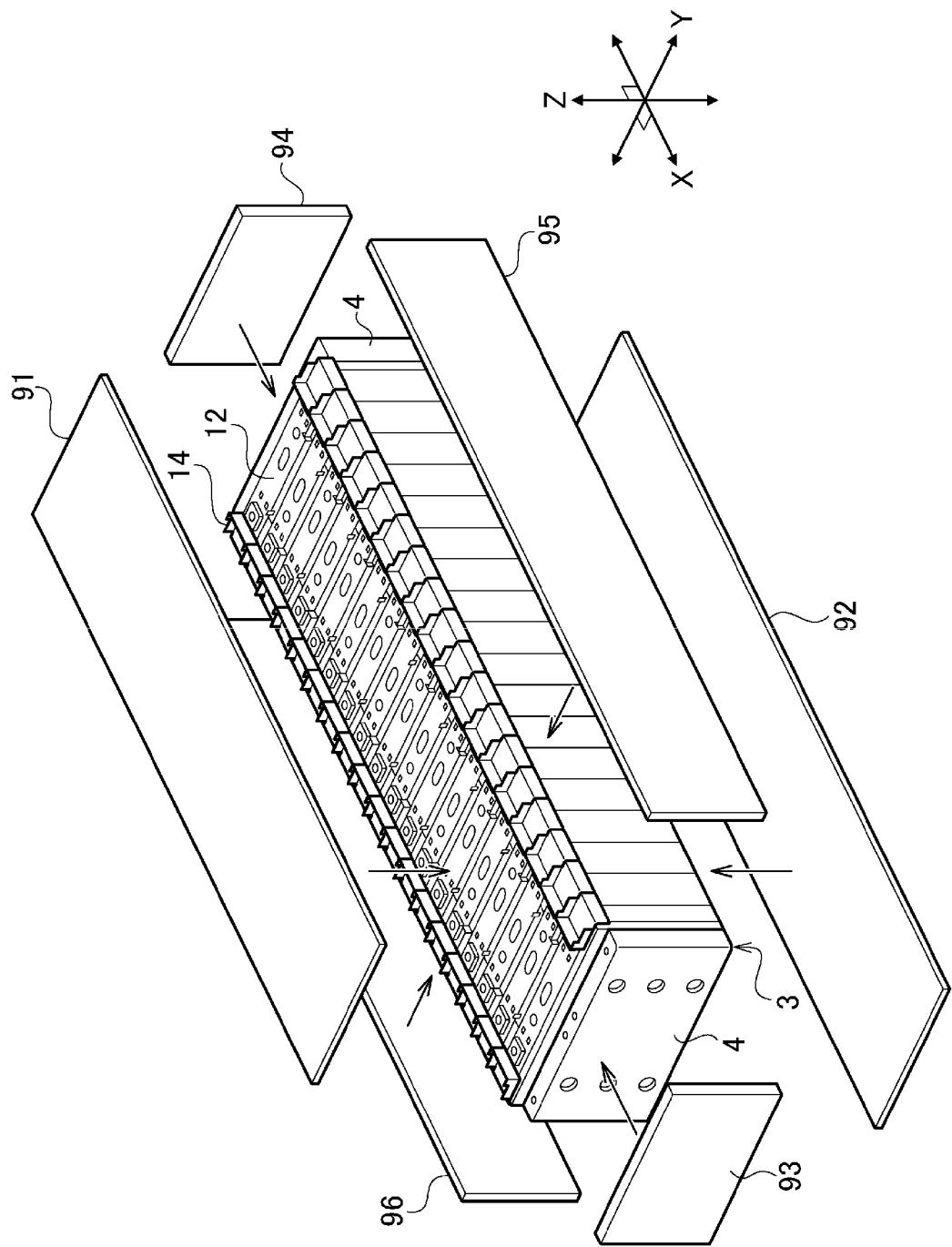
FIG. 7 is a process diagram that illustrates the battery module production method.

Next, first jig 91 is pressed against a top surface of assembled set 3, as illustrated in FIG. 7. Second jig 92 is pressed against a bottom surface of assembled set 3. Third jig 93 and fourth jig 94 are pressed against two respective side surfaces of the assembled set that are opposite each other in stack direction X. That is, third jig 93 and fourth jig 94 are pressed against respective main surfaces of end plates 4. Fifth jig 95 and sixth jig 96 are pressed against two side surfaces of the assembled set that are opposite each other in direction Y.

Consequently, first jig 91 applies external force F1 in direction Z to a top surface of assembled set 3, as illustrated in FIG. 8A. In other words, external force F1 in direction Z is external force F1 in a direction that crosses top surface n1 of battery 12, or external force F1 in a direction in which top surface n1 of battery 12 and bottom surface n2 of battery 12 are arranged. Further, second jig 92 applies external force F2 in direction Z to a bottom surface of assembled set 3. External force F1 and external force F2 have opposite directions. Further, fifth jig 95 and sixth jig 96 apply external forces F5, F6 in direction Y to side surfaces of assembled set 3, respectively. External force F5 and external force F6 have opposite directions. Further, third jig 93 and fourth jig 94 apply external forces F3, F4 (see FIG. 9) in stack direction X to side surfaces of assembled set 3, respectively. External force F3 and external force F4 have opposite directions.

When first jig 91 is pressed against assembled set 3, first jig 91 is in contact with input parts 38 of each separator 14. Consequently, external force F1 is applied to input parts 38. Batteries 12 generally often vary in dimensions due to manufacturing errors (tolerances), for example. Therefore, at least part of the plurality of batteries 12 of battery module 1 each have a length from bottom surface n2 to top surface n1 that is different from a length from bottom surfaces n2 to top surfaces n1 of other batteries 12. A maximum difference between the lengths is less than or equal to approximately 1 mm. Due to the dimensional errors, sets of each battery 12 and each separator 14 vary in a length from bottom surface n2 of battery 12 to front ends of input parts 38 of separator 14. If the lengths vary, it is difficult to allow bottom surfaces n2 of all batteries 12 to be in contact with second jig 92 even if first jig 91 is pressed against assembled set 3. That is, it is difficult to allow bottom surfaces n2 of batteries 12 to be at a same height.

For the difficulty, input parts 38 are deformable by external force F1. Therefore, if external force F1 is applied to input parts 38, a front end of each input part 38 is pressed and deformed to a degree that corresponds to a height of the front end, as illustrated in FIG. 8B. The higher a front end of input part 38, the more input part 38 is pressed and deformed. Consequently, the front ends of input parts 38 of separators 14 are at a same height that corresponds to first jig 91. Consequently, external force F1 is input into all separators 14. Battery pressing parts 36 of each separator 14 use external force F1 input into input parts 38 to press top surface n1 of battery 12. Consequently, bottom surfaces n2 of batteries 12 are pressed against second jig 92, and thus bottom surfaces n2 are at a same height. Consequently, batteries 12 are positioned in direction Z.

Each separator 14 according to the present exemplary embodiment does not include a portion that protrudes more than two input parts 38 and is between two input parts 38. Therefore, first jig 91 that is flat-sheet-shaped is used. That is, although first jig 91 has a simple shape, first jig 91 is in contact with only input parts 38 of each separator 14. Therefore, a jig that has a complicated shape is not used.

Input parts 38 and battery pressing parts 36 are at different positions in stack direction X. That is, battery pressing parts 36 and points where external force F1 is input into separator 14 are at different positions in stack direction X. Therefore, a space is secured over each battery pressing part 36. Each first positioning member 34 is disposed in the space.

Further, input parts 38 seen in direction Z overlap intervening portion 14a. That is, input parts 38 seen in a direction of external force F1 being input overlap intervening portion 14a. Consequently, external force F1 input into input parts 38 is surely transferred to intervening portion 14a. Since external forces F3, F4 are applied to assembled set 3, each intervening portion 14a is sandwiched by adjacent batteries 12. Consequently, displacement of each intervening portion 14a in direction Z may be hindered. However, since input parts 38 seen in a direction of external force F1 being input overlap intervening portion 14a, intervening portion 14a is surely displaced in direction Z. That is, each intervening portion 14a is pressed into a gap between adjacent batteries 12. Consequently, each battery pressing part 36 is surely pressed against top surface n1 of battery 12.

Batteries 12 are positioned in direction Y by fifth jig 95 and sixth jig 96 that press assembled set 3. Further, batteries 12 are positioned in stack direction X by third jig 93 and fourth jig 94 that press assembled set 3. One of first jig 91 and second jig 92 may be fixed and the other jig may be displaced to apply external force to assembled set 3. Further, one of third jig 93 and fourth jig 94 may be fixed and the other jig may be displaced to apply external force to assembled set 3. Further, one of fifth jig 95 and sixth jig 96 may be fixed and the other jig may be displaced to apply external force to assembled set 3.

Figure 9:
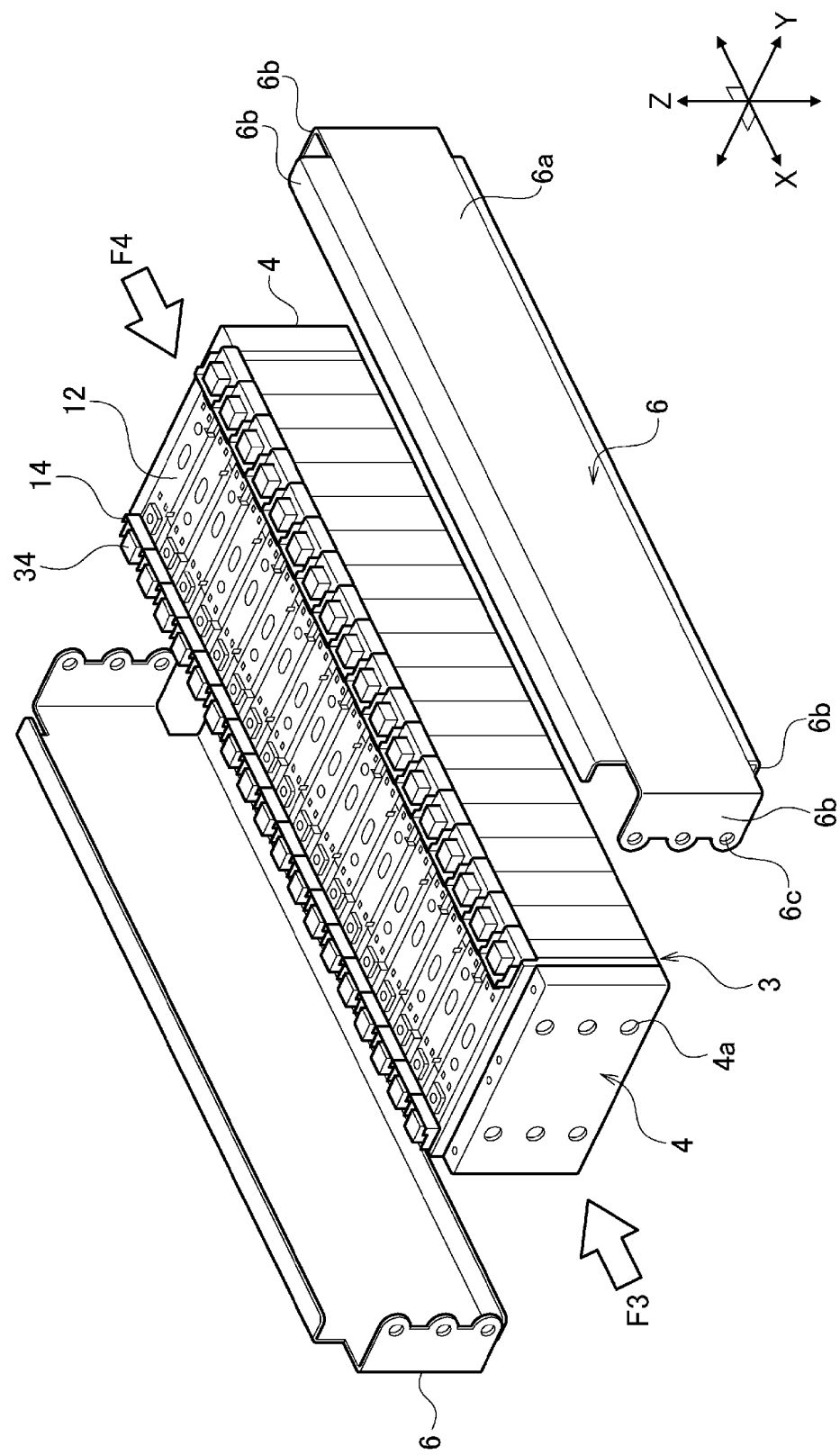
FIG. 9 is a process diagram that illustrates the battery module production method.

Then, as illustrated in FIG. 9, first positioning members 34 are attached to assembled set 3. Then a pair of restraint members 6 are attached to assembled set 3. At that time, external forces F3, F4 are kept applied. Part of assembled set 3 enters a space surrounded by four eaves portions 6b of each restraint member 6. Further, each restraint member 6 is positioned. Consequently, through holes 6c of eaves portions 6b are disposed over screw holes 4a of end plates 4. In that condition, fastening screws 16 (see FIG. 2) are screwed into screw holes 4a through through holes 6c. Consequently, the pair of end plates 4 and the pair of restraint members 6 fasten the plurality of batteries 12 and the plurality of separators 14 together.

Two eaves portions 6b that are opposite each other in stack direction X fasten and fix the plurality of batteries 12 in stack direction X. Two eaves portions 6b that are opposite each other in direction Z fix the plurality of batteries 12 in direction Z. Planes 6a fix the plurality of batteries 12 in direction Y. In that condition, bus bars are electrically connected to output terminals 22 of batteries 12, and thus battery stack 2 is made. Then cover 8 is attached to a top surface of battery stack 2, and heat dissipater 10 is attached to a bottom surface of battery stack 2. Battery module 1 is made through the steps described above.

As described above, each separator 14 according to the present exemplary embodiment includes intervening portion 14a that is between two adjacent batteries 12 and insulates two batteries 12, input parts 38 that receives external force F1 input during assembly of battery module 1 and is deformable by external force F1, and battery pressing parts 36 that are in contact with a first surface of one of batteries 12 which extends in stack direction X, that is top surface n1, and use external force F1 input into input parts 38 to press top surface n1. Since separators 14 are used in battery module 1, second surfaces of batteries 12 that are opposite first surfaces of batteries 12, in other words, bottom surfaces n2, are at a same height.

Consequently, when heat dissipater 10 is disposed on a bottom surface of battery stack 2, bottom surfaces n2 of batteries 12 are in contact with heat dissipater 10. Consequently, distances between batteries 12 and heat dissipater 10 are equal, and thus battery stack 2 is uniformly cooled. Consequently, a concentration of heat does not occur at part of battery stack 2. According to the present exemplary embodiment, an intervening layer that fills unevenness of a bottom surface of battery stack 2 does not need to be disposed between battery stack 2 and heat dissipater 10. That is, batteries 12 are directly in contact with heat dissipater 10. Consequently, battery stack 2 is efficiently cooled.

Further, in the present exemplary embodiment, each separator 14 includes input parts 38 that are structures that absorb dimensional variation in batteries 12. Consequently, first jig 91 does not have a complicated structure. If first jig 91 includes structures that absorb dimensional variation, it is difficult to deal with a change to a pitch between batteries 12 and a change to a number of batteries 12. However, if separators 14 include such structures, the difficulties are solved.

Input parts 38 and battery pressing parts 36 are at different positions in stack direction X. Consequently, a space is secured over each battery 12. Further, input parts 38 seen in a direction of external force F1 being input overlap intervening portion 14a. Consequently, bottom surfaces n2 of batteries 12 are surely at a same height.

The present invention is not limited to the exemplary embodiment described above. The exemplary embodiment may be modified, such as various design changes based on knowledge of a person skilled in the art. The modified exemplary embodiments also fall within the scope of the present invention. New exemplary embodiments obtained by modifying the exemplary embodiment described above have effects of combined exemplary embodiments and effects of the modified exemplary embodiments.

(Modification 1)

Figure 10:
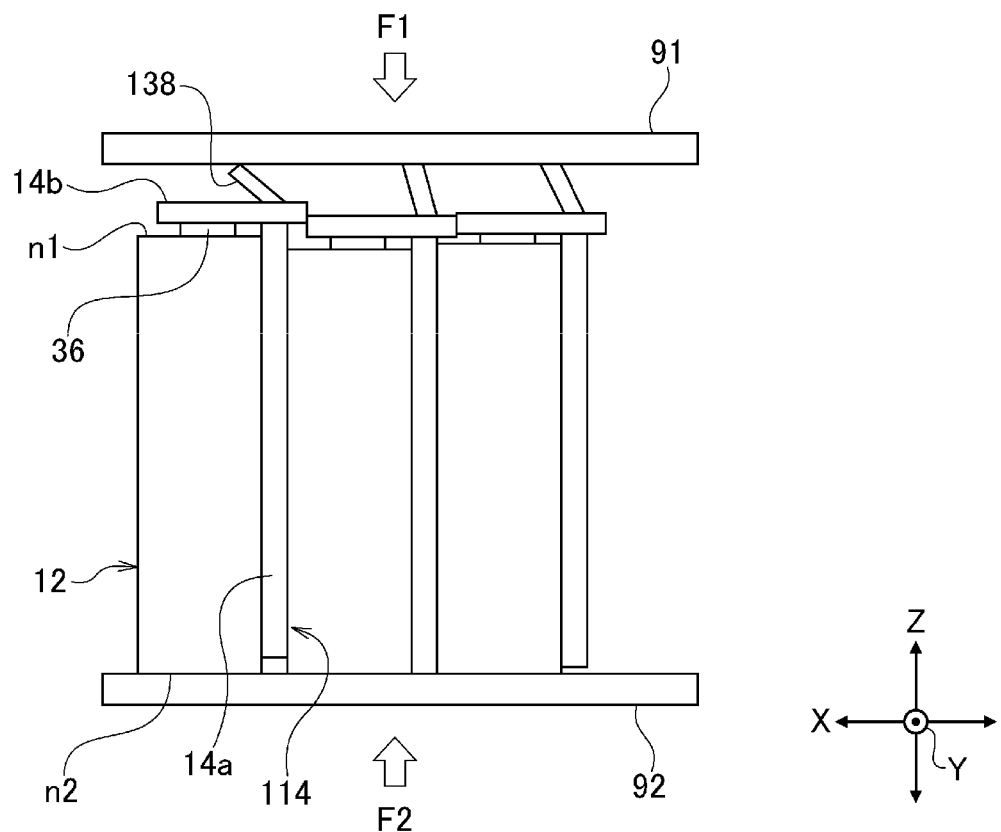
FIG. 10 illustrates a battery module production method according to modification 1.

FIG. 10 illustrates a battery module production method according to modification 1. As illustrated in FIG. 10, separators 114 according to modification 1 differ from separators 14 according to the exemplary embodiment in only structures of input parts 138. Input parts 138 that are flat-sheet-shaped are inclined relative to a direction of external force F1 being input, that is a direction of a normal line to top surface n1. That is, input parts 138 each extend in a direction that crosses a direction of external force F1 being input. Therefore, if first jig 91 is pressed against input parts 138, input parts 138 bend or are inclined from bases of input parts 138 or a whole of each input part 138 bends. Consequently, front ends of input parts 138 are brought closer to bottom surfaces n2 of batteries 12. Consequently, the front ends of input parts 138 of separators 14 are at a same height that corresponds to first jig 91. The structure also allows bottom surfaces n2 of batteries 12 to be in contact with heat dissipater 10. Consequently, battery stack 2 is uniformly cooled. Low rigidity of input parts according to the exemplary embodiment may be combined with the inclined input parts according to modification 1.

(Modification 2)

Figure 11A:
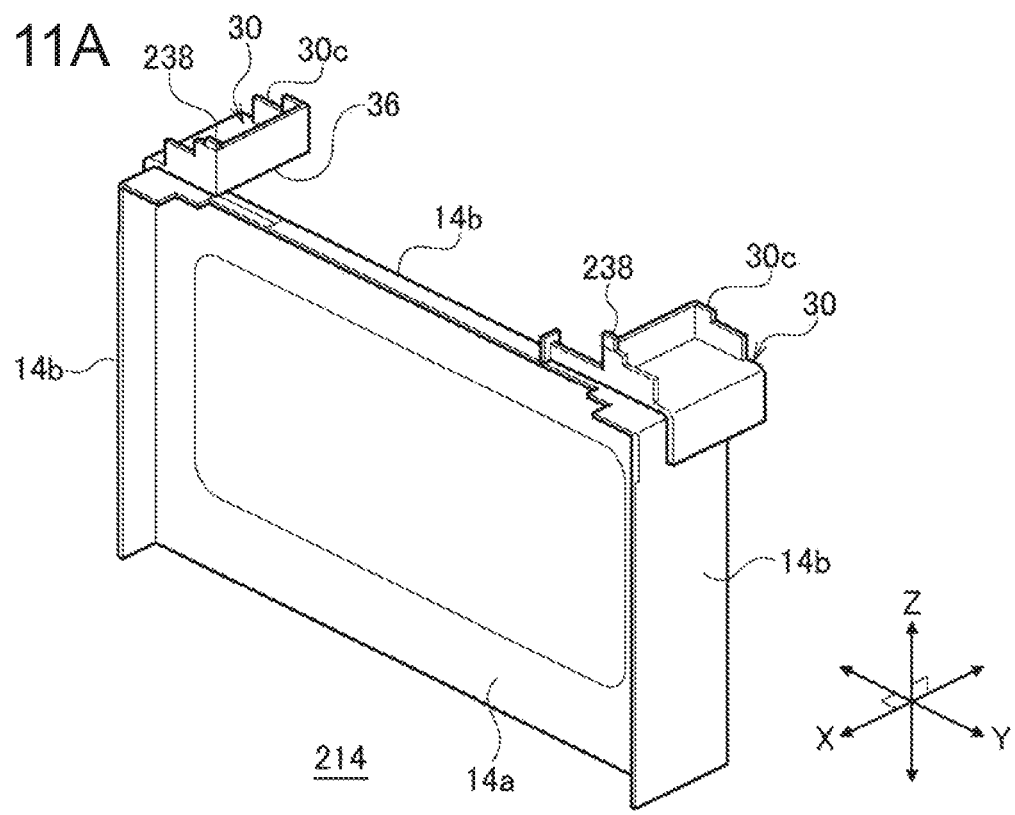
FIG. 11A is a schematic perspective view that illustrates a structure of a separator according to modification 2.

FIG. 11A is a schematic perspective view that illustrates a structure of a separator according to modification 2. Separators 214 according to modification 2 differ from separators 14 according to the exemplary embodiment only in positions of input parts 238. Each input part 238 is on an upper edge of frame 30c of each support 30. Further, input parts 238 seen in direction Z overlap intervening portion 14a. The structure also allows bottom surfaces n2 of batteries 12 to be in contact with heat dissipater 10. Consequently, battery stack 2 is uniformly cooled.

(Modification 3)

Figure 11B:
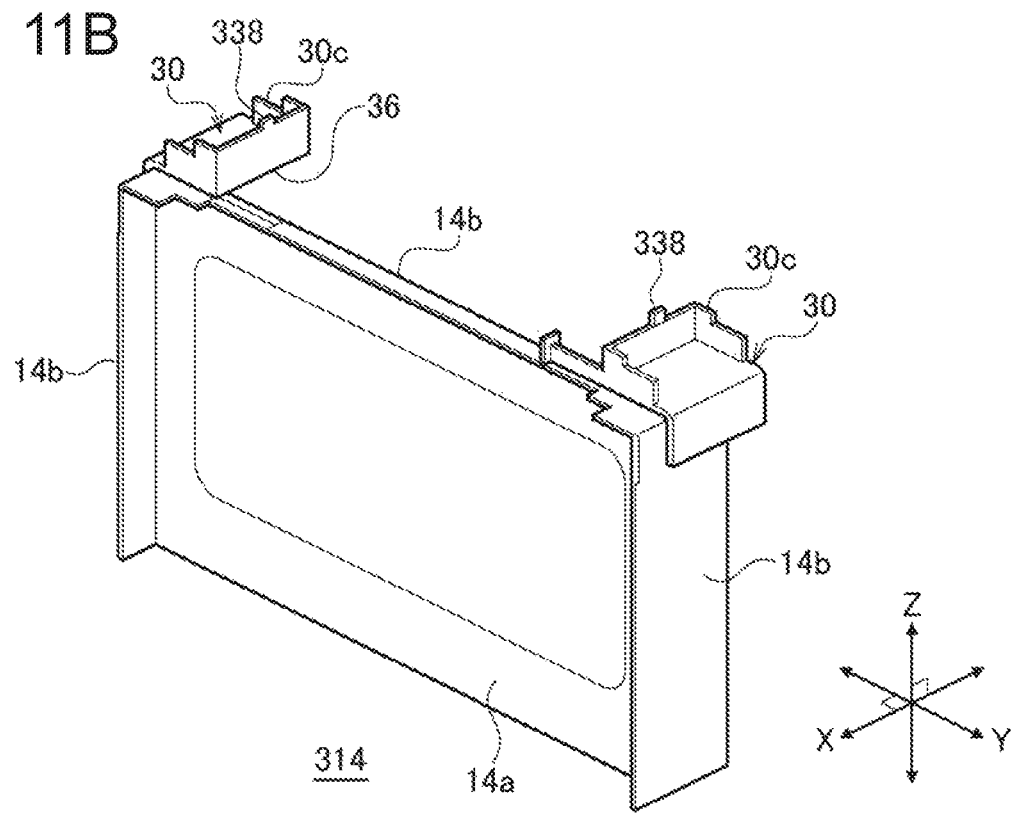
FIG. 11B is a schematic perspective view that illustrates a structure of a separator according to modification 3.

FIG. 11B is a schematic perspective view that illustrates a structure of a separator according to modification 3. Separators 314 according to modification 3 differ from separators 14 according to the exemplary embodiment only in positions of input parts 338. Each input part 338 is on an upper edge of frame 30c of each support 30. Further, input parts 338 seen in direction Z overlap respective battery pressing parts 36. The structure also allows bottom surfaces n2 of batteries 12 to be in contact with heat dissipater 10. Consequently, battery stack 2 is uniformly cooled.

(Others)

Batteries 12 are prismatic batteries in the exemplary embodiment described above. However, a shape of batteries 12 is not particularly limited, and may be cylindrical, for example. A number of batteries 12 of a battery stack is not particularly limited. Further, each battery 12 does not necessarily need to include insulating film 42. Separators may each include only one input part at a center, in direction Y, of each separator. If each separator includes a plurality of input parts, first jig 91 needs to be prepared for each input part. If each separator includes one input part, one first jig 91 needs to be prepared.

Any combination of the components described above is also effective as aspects of the present invention. Further, conversions of an expression of the present invention between methods, devices, systems, and the like are also effective as aspects of the present invention.

REFERENCE MARKS IN THE DRAWINGS

1: battery module
10: heat dissipater
12: battery
14, 114, 214, 314: separator
14a: intervening portion
36: battery pressing part
38, 138, 238, 338: input part
91: first jig
92: second jig

The invention claimed is:

1. A separator used in a battery module that includes a plurality of batteries stacked in a stack direction, the separator comprising:

an intervening portion that extends in a first direction and a second direction crossing the first direction and is disposed between two adjacent batteries of the plurality of batteries and insulates the two adjacent batteries, the first and second directions crossing the stacking direction;

an input part configured to receive external force input during assembly of the battery module and to be deformable by the external force applied along the second direction; and a pair of battery pressing parts disposed at two end portions along the first direction of the intervening portion and configured to be in contact with a first surface of only one of the two adjacent batteries, the first surface extending in the stack direction and the first direction, and to use the external force input into the input part to press the first surface, wherein a space is provided between the intervening portion and each of the pair of battery pressing parts.

2. The separator according to claim 1, wherein the input part and each of the pair of battery pressing parts are at different positions when viewed in the stack direction.

3. The separator according to claim 1, wherein the input part seen in the second direction overlaps the intervening portion.

4. The separator according to claim 1, wherein the input part has rigidity lower than rigidity of the intervening portion.

5. The separator according to claim 4, wherein the input part has a thickness smaller than a thickness of the intervening portion.

6. The separator according to claim 1, wherein the input part is inclined relative to the second direction.

7. The separator according to claim 1, further comprising:
a pair of side walls disposed at both sides of the intervening portion and extending in the stack direction and the second direction;
an upper wall disposed on a top portion of the intervening portion extending in the stack direction and the first direction.

8. The separator according to claim 7, wherein:
a plurality of input parts that are spaced apart from each other in the first direction are provided, and
one of the plurality of input parts directly protrudes from the upper wall.

9. The separator according to claim 8, wherein another of the plurality of input parts is disposed at an extension part extending from one of the pair of battery pressing parts.

10. The separator according to claim 1, further comprising a support disposed at a corner of the separator,
wherein an uppermost portion of the support is higher than a top of the input part.

11. The separator according to claim 1, wherein the pair of battery pressing parts are disposed at a first side of the intervening portion and no battery pressing part is disposed at a second side of the intervening portion opposite to the first side along the stack direction.

12. A separator used in a battery module that includes a plurality of batteries stacked in a stack direction, the separator comprising:
an intervening portion that extends in a first direction and a second direction crossing the first direction and is disposed between two adjacent batteries of the plurality of batteries and insulates the two adjacent batteries, wherein the first and second directions cross the stacking direction and a lower end of the intervening portion is disposed above bottom faces of the two adjacent batteries, an input part configured to receive external force input during assembly of the battery module and that is to be deformable by the external force applied along the second direction; and a pair of battery pressing parts disposed at two end portions along the first direction of the intervening portion and configured to be in contact with a first surface of only one of the two adjacent batteries, the first surface extending in the stack direction and the first direction, and to use the external force input into the input part to press the first surface.

13. The separator according to claim 12, wherein the input part and each of the pair of battery pressing parts are at different positions when viewed in the stack direction.

14. The separator according to claim 12, the input part seen in the second direction overlaps the intervening portion.

15. The separator according to claim 12, wherein the input part has rigidity lower than rigidity of the intervening portion.

16. The separator according to claim 15, wherein the input part has a thickness smaller than a thickness of the intervening portion.

17. The separator according to claim 12, wherein the input part is inclined relative to the second direction of the external force being input.

18. The separator according to claim 12, further comprising:
a pair of side walls disposed at both sides of the intervening portion and extending in the stack direction and the second direction;
an upper wall disposed on a top portion of the intervening portion extending in the stack direction and the first direction.

19. The separator according to claim 18, wherein:
a plurality of input parts that are spaced apart from each other in the first direction are provided, and
one of the plurality of input parts directly protrudes from the upper wall.

20. The separator according to claim 19, wherein another of the plurality of input parts is disposed at an extension part extending from one of the pair of battery pressing parts.

* * * * *